Nov. 19, 1968  F. M. IANNELLI  3,411,540
MIXER DISPENSING VALVE
Filed Oct. 20, 1965  2 Sheets-Sheet 1
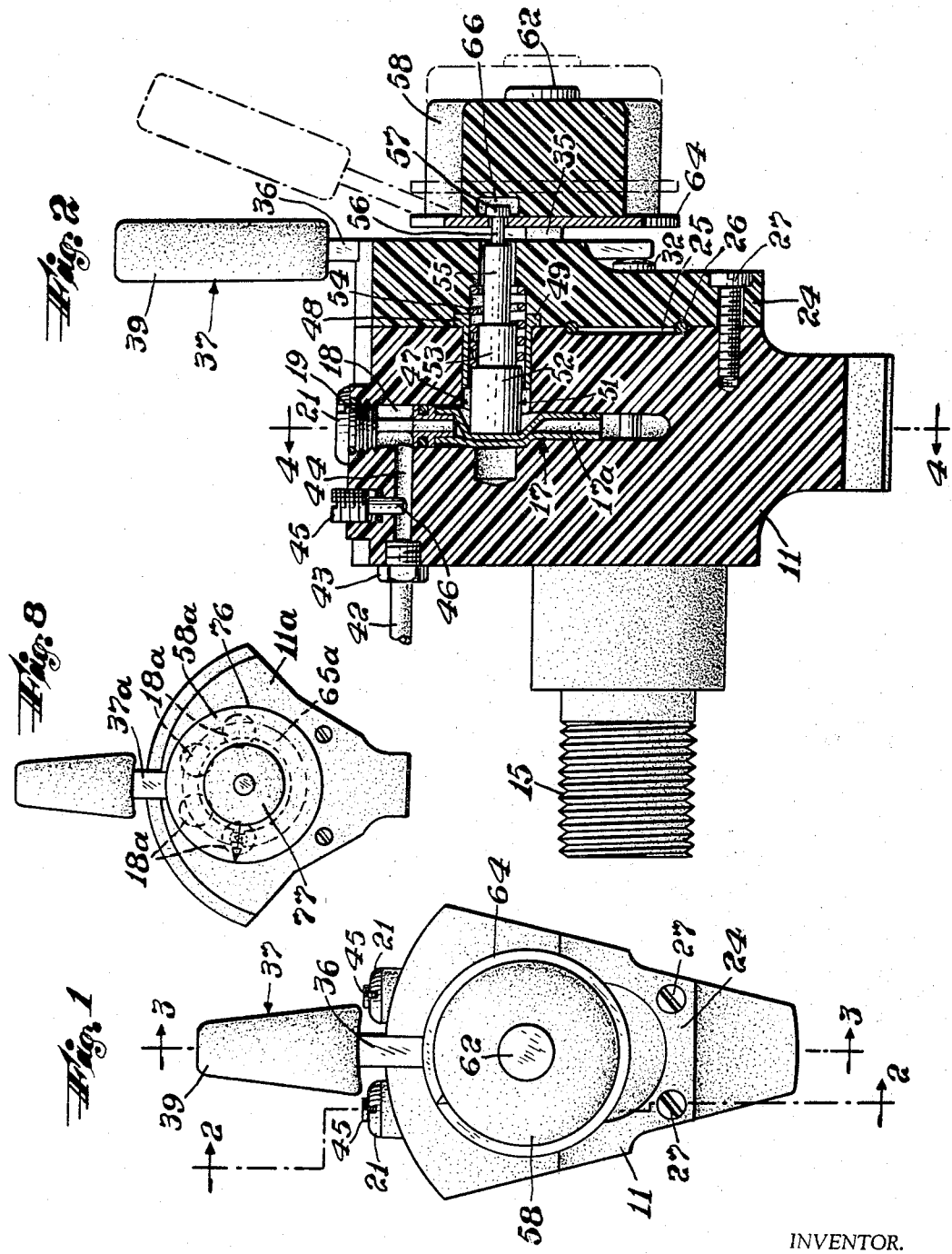
INVENTOR.
Frank M. Iannelli
BY
ATTORNEY

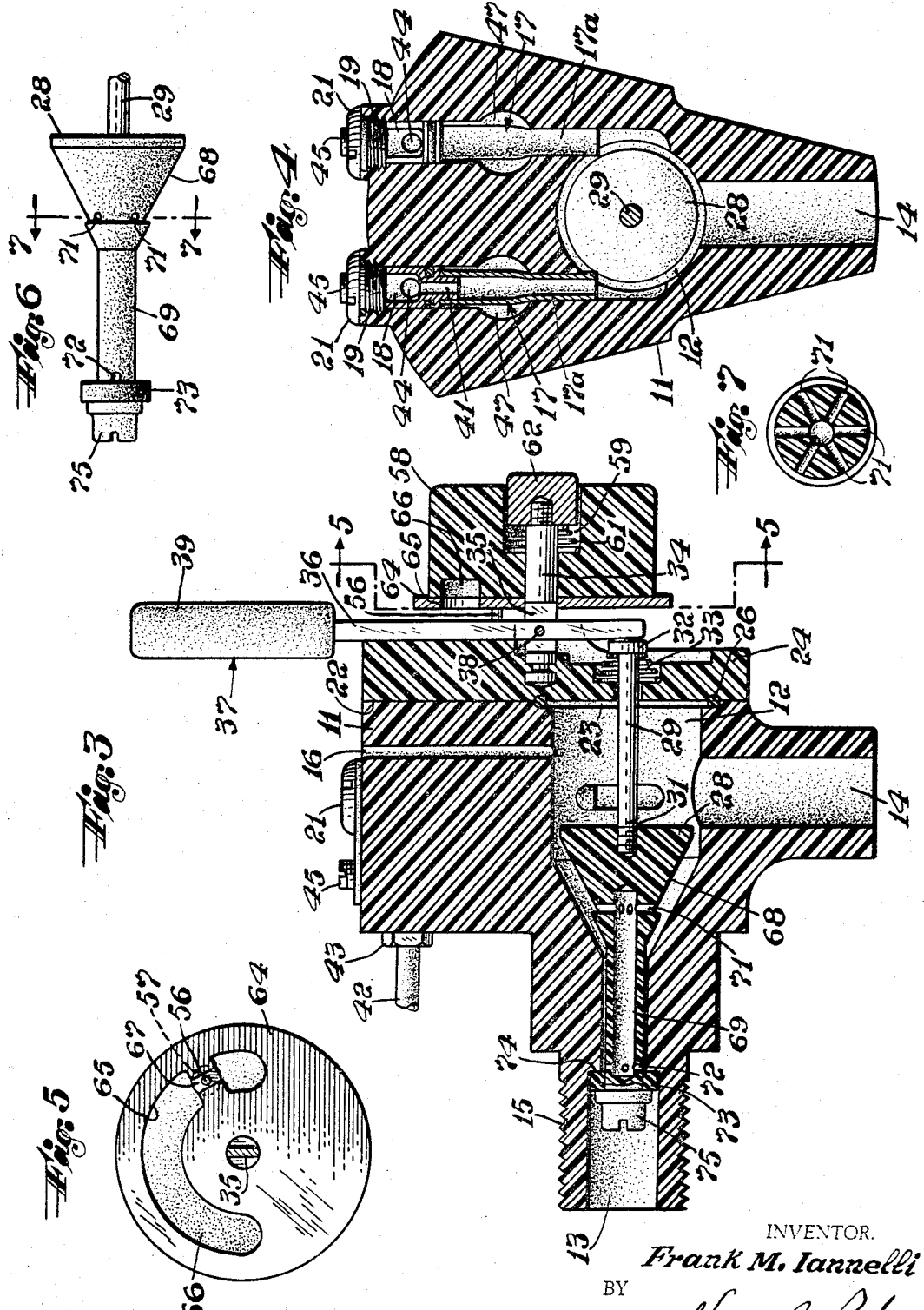

United States Patent Office 3,411,540
Patented Nov. 19, 1968

3,411,540
MIXER DISPENSING VALVE
Frank M. Iannelli, 5 Penwood Road,
Livingston, N.J. 07039
Filed Oct. 20, 1965, Ser. No. 498,318
3 Claims. (Cl. 137—635)

This invention relates to devices for mixing and dispensing liquids, as in mixing sodawater with a flavoring agent, such as a strawberry or chocolate syrup, and, more particularly, to one in which the mixing and discharging is effected by a single operating means.

An object of my invention is to mix a selected liquid, such as a flavoring syrup, with a mixer liquid such as carbonated water, and discharge the mixed liquids to a glass or other receptacle for immediate use.

Another object of my invention is a mixing device which allows for the convenient and rapid selection of the syrup or the like and the quick mixing of such a syrup with a diluting liquid such as carbonated water for immediate dispensing or serving.

A further object of my invention is to allow for adjustment of the rate of flow of the selected flavoring syrup or other liquid to be diluted prior to use.

A still further object of my invention is to allow for diffusion of the mixer liquid with the flavoring or other liquid with which it is to be incorporated.

These and other objects and advantages will become apparent from the following detailed description when taken with the accompanying drawings. It will be understood that the drawings are for purposes of illustration and do not define the scope or limits of the invention, reference being had for the latter purpose to the appended claims.

In the drawings, wherein like reference characters denote like parts in the several views:

FIGURE 1 is a front or end elevational view of a liquid mixer embodying my invention.

FIGURE 2 is a vertical longitudinal off-axis sectional view on the line 2—2 of FIGURE 1, in the direction of the arrows.

FIGURE 3 is a vertical longitudinal axial sectional view on the line 3—3 of FIGURE 1, in the direction of the arrows.

FIGURE 4 is a transverse vertical generally mid-sectional view on the line 4—4 of FIGURE 2, in the direction of the arrows.

FIGURE 5 is a transverse vertical sectional view on the line 5—5 of FIGURE 3, in the direction of the arrows.

FIGURE 6 is a side elevational view of the valve which controls the flow of the mixer liquid.

FIGURE 7 is a transverse vertical sectional view on the line 7—7 of FIGURE 6, in the direction of the arrows.

FIGURE 8 is a fragmentary front end elevational view of another embodiment of my invention.

Referring to the drawings in detail, and first considering the embodiment of my liquid mixer illustrated in FIGURES 1 to 7, inclusive, there is shown a casing or housing 11, which may be formed of suitable material, including a plastic such as Lucite, nylon, or the like. Said casing 11 is hollow so as to provide a mixing and discharge passage 12, comprising a longitudinal, normally horizontal inlet passage 13 for receiving a mixer liquid, and a normally vertical laterally or downwardly extending outlet passage 14, through which the mixed liquids may be discharged from the casing 11. The outer or normally rear end of the portion forming the inlet passage 13 is desirably threaded, as indicated at 15, for connection with a source of mixing liquid, which may be plain or carbonated water. There is a vent passage or port 16, relatively small in diameter, to facilitate operation of the mixer, as by allowing drainage of fluid in the passage 12, even when the passage 13 is shut off.

The casing 11 holds a plurality of valves 17, here shown as two, although there may be more, if desired, as represented in FIGURE 8. These valves are here shown disposed side by side in normally vertical or lateral ports 18, through a selected one or other of which may be fed a liquid to be combined with the mixer liquid in said mixing and discharge passage 12. These valves 17 include flexible tubes 17a in ports 18 which at their lower ends have outlets in the discharge passage and which terminate at their upper or outer ends in threaded portions 19, receiving correspondingly threaded caps or valve tube holders 21 which close the end portions of said ports.

The large end portion of the passage 12 opens at the front, normally vertical face 22, as an aperture 23 in the casing 11 and is closable by a cover plate 24, which may be formed of suitable material like that of the casing 11. The aperture 23 at its extreme outer end is provided with a groove 25 receiving an O ring or other gasket 26 for preventing leakage between the casing 11 and the plate 24 when assembled, as shown in FIGURES 2 and 3, whereby said plate 24 may be held seated on the outer face of said casing over said aperture as by means of screws or other securing means 27. There is a valve 28 for controlling the flow of the mixer liquid through the inlet passage 13, said valve being movable in said passage 13 to open or close the same. There is a stem 29 carried by the valve 28 and reciprocable through the plate 24, as illustrated. The valve stem 29 is desirably threadably connected to the valve, as indicated at 31, and carries a head 32 normally outside of said plate 24.

A coil spring 33 is mounted on the stem 29 and acts between the head 32 and plate 24 to bias the valve 28 to closed position. There is a stud 34 with one end fixed in, and its outer portion outstanding from, the plate 24. An intermediate portion of said stud 34 is cut away on both sides to form a generally rectangular section 35, which is straddled by the lever 36 of valve-operating means 37. Said lever 36 is at the section 35 pivotally connected to the stud 34 as by pivot pin 38, whereby said lever is fulcrumed on said stud for swinging about a normally horizontal transverse axis. The outer end portion of the lever may have a hand grip 39 for manual operation of said lever. The inner end portion of said lever 36 normally engages the valve stem head 32 so that said valve is opened upon moving the outer lever portion 39 away from said plate 24.

Each valve 17 in an inlet port 18 includes the flexible, preferably synthetic plastic tube 17a, the outer end of which is secured to the lower or inner end of an inward extension from its cap 21. Each extension has an aperture 41 to allow the flow of syrup or other liquid from a tube or pipe 42 threadably connected to the casing 11, as by means of a plug 43. Thus, such liquid may flow through a passage 44 in the casing 11 to the inlet of the corresponding port 18 for feeding to its valve 17. Control of the velocity of flow of the syrup or other liquid through each port 44 is effected by an adjusting screw 45 threadably connected to the casing 11 and with an inward extension 46 which more or less restricts the effective size of its port 44.

There is a hole 47 extending from a side of each port 18 and terminating at the outer face 22 of the casing. There are corresponding holes in the cover plate 24 which mate with said casing holes extending from the sides of said ports when said plate and casing are assembled, as illustrated in FIGURES 2 and 3. The mated holes serve to house and hold desirably metal bushings 48, the outer edge portion of each of which is outwardly flanged, as indicated at 49, to overlie the edge of its hole 47 in the casing 11. Each bushing is thus held in place, as its flange nests in a corresponding groove outside of the passage extension in the cover plate 24.

There is an operating plunger 51 in each of said holes 47, extending from the sides of the ports 18, for controlling the tubes, desirably formed of solid polyurethane or other suitable elastic material, which form the bodies of the valves 17. Each plunger 51 is formed with an inner part of relatively large diameter, designated 52, a part next thereto, designated 53, and of smaller diameter. Thus, a shoulder is left therebetween to be engaged by a coil spring 54 operating between said shoulder and an outer shoulder portion defining the mating passage in the cover plate 24, so that said spring tends to urge its plunger to a position to close the corresponding valve 17, as by flattening the flexible tube thereof and pushing it into an extension of the hole 47 to the left of said tube, as viewed in FIGURE 2. Beyond the intermediate portion 53 is an extension 55 from the extreme or outer end of which projects a neck portion 56 terminating in a head 57, which neck and head outstand beyond the outer surface of the plate 24 when assembled.

A selector knob 58 is pivoted on the stud 34, the outer surface of said knob being pocketed, as indicated at 59. A coil spring 61 is disposed around the stud 34 and seated in said pocket 59. There is a thumb nut 62 threaded on a reduced outer portion 63 of the stud and engaged by said coil spring 61, which it holds in place in said pocket, whereby said knob 58 is biased toward the lever 36 to hold the latter against the cover plate 24.

A selector plate 64 is carried on the cover-adjacent surface of said knob 58 and through which the stud 34 passes. This plate has a slot 65 arcuate around the pivotal axis of said knob and stud and of sufficient width to allow passage of the plunger heads 57. There is a corresponding depression 66 in the knob surface over which the slot 65 mates, and said slot has a restriction 67 intermediate its ends, corresponding in width with the diameter of the plunger necks 56, but with sufficient clearance to allow passage of said necks therethrough.

The valve 28 controlling the flow of mixer liquid has a tapered or frusto-conical body 68, terminating at its smaller end in a hollow extension 69 which has lateral ports 71 and 72 connecting the interior of said extension with its exterior to effect diffusion of the carbonated water, or other mixer liquid, with the syrup, or other liquid with which it is mixed in the mixing and discharge passage 12. The extreme outer end of the extension portion 69 carries a gasket 73 which engages a shoulder valve seat 74 on the casing 11 to effect closure of the passage 13, said gasket being held in place by a set screw or other suitable holding means 75. The ports 71 and 72 are disposed adjacent the smaller end of the body 68 and adjacent the gasket 73, respectively.

From the foregoing disclosure of the illustrated embodiment of my invention, it will be clear that operation thereof is effected, after the threaded portion 15 and the tubes or pipes 44 are connected to the sources of the desired liquids to be mixed, by first moving the selector knob 58 until the head 57 of the plunger controlling the valve of the liquid selected to be fed to the mixer liquid, is disposed at the restriction 67, as viewed in FIGURE 5, with neck 57 therein.

The operating means 37 is then moved, from the full line to the dot-dash line position, as illustrated in FIGURE 2, whereupon the selected plunger 51 is moved to the right, as in said figure, to release its valve 17 by allowing the corresponding flexible tube to assume a normal or unsqueezed position, and allow the syrup, or other selected liquid, to flow into the passage 12. Simultaneously, the rear or inner end of the lever 36 moves to the left to effect a corresponding movement of the stem 29 and opening of the valve 28 to allow the carbonated water, or other mixer liquid, to flow from the passage 13 to the right, as viewed in FIGURE 3, to combine with the syrup, or other selected liquid, while and after diffusing into the mixing and discharge passage 12, from which it is discharged down through the passage 14 for reception in a glass or other device which a customer may use.

Referring now to the embodiment of my invention illustrated in FIGURE 8, there is shown a casing or housing 11a, which corresponds with that designated 11 in the first embodiment except that there are shown four rather than only two ports 18a which receive corresponding valves, not shown, but like those illustrated in FIGURE 2. The control knob 58a, in the present embodiment, is generally like that designated 58 in the first embodiment, except that it is movable to a selected one of four positions rather than to a selected one of two positions for picking the desired liquid to be fed to a mixing and discharge passage, like that designated 12 in FIGURES 3 and 4.

As in the first embodiment, there is an operating lever 37a which is moved for effecting the desired operation in the mixer. By virtue of the fact that there are four, rather than two, ports through which syrup or other liquid is fed to the mixer, the selector knob 58a is desirably larger than that of the first embodiment. Also, the arcuate slot 65a may be in a plate, like that designated 64 in FIGURE 5, but which has a diameter sufficiently large so that its peripheral portion underlies a flange portion or annular extension 76, beyond a central portion 77 which is to be manually gripped in making the selection. Except as specifically described in this embodiment, the mixer dispensing valve of this embodiment may correspond with, and be operated like, that of the first embodiment.

Although only two embodiments have been illustrated and described, it will be understood that modifications may be made within the scope of the invention.

I claim:

1. A liquid mixer comprising a casing having a port therein formed with an inlet and an outlet for a liquid, a valve controlling said port, valve operating means, a device for connecting the valve and said valve-operating means to operate the valve, a mixing and discharge passage communicating with the valve port outlet and having at one end a supply inlet for a mixing liquid and an outlet for the mixture, said supply inlet having a valve seat, and a discharge and mixing valve having a gasket cooperative with said valve seat to open and close said supply inlet and being operable by said valve-operating means providing for opening of the first-mentioned valve and opening of said mixing and discharge valve by one and the same operation of said valve-operating means, the end of said mixing and discharge passage opposite said supply inlet for the mixing liquid being closed by a cover plate, means holding said cover plate in fluid-tight relationship over said passage and seated on an outer face of said case, said discharge and mixing valve having a valve stem reciprocable through said plate, said valve for controlling said port comprising a flexible tube in the port, a hole extending from a side of said port and terminating at said outer face of the casing, holes in said cover plate mating with the hole that extends from the side of said port when said cover plate and casing are assembled, an operating plunger in said holes that extend from the side of said port for controlling said flexible tube, and spring means biasing said plunger to hold said tube closed, said plunger having a portion projecting beyond the outer surface of said cover plate when assembled and being actuated by said valve-operating means to allow the tube to open.

2. A liquid mixer as recited in claim 1 wherein there is a stud on said cover plate and a selector knob rotatable on said stud, the knob having a pocket in which there is a coil spring disposed around said stud and seated in said pocket, said valve-operating means comprises a lever fulcrumed intermediate its ends on said stud to swing about a transverse axis, the outer end portion of said lever is manually operable and the inner portion engages said valve stem so that said discharge and mixing valve is opened upon movement of the outer lever portion away from said plate and there is a thumb nut holding said coil spring in said pocket so that said knob is biased toward said lever to hold the lever in rest position against said cover plate, said projecting portion of said plunger has a head thereon, a selector plate is carried on the cover-adjacent surface of said knob, said selector plate has a slot arcuate about the pivotal axis of said knob and of a width sufficient to allow the passage of said plunger head therethrough, said selector plate slot has a restriction intermediate its ends of a width corresponding to the diameter of said projecting portion of the plunger providing selectively for disengagement of the selector plate from the head of the plunger or for engagement of the plate with said head upon movement of the said outer lever portion away from said cover plate.

3. A liquid mixer comprising a casing having a port therein formed with an inlet and an outlet for a liquid, a valve controlling said port, valve operating means, a device for connecting the valve and said valve operating means to operate the valve, a mixing and discharge passage communicating with the valve port outlet and having at one end a supply inlet for a mixing liquid and an outlet for the mixture, said supply inlet having a valve seat, and a discharge and mixing valve having a gasket cooperative with said valve seat to open and close said supply inlet and being operable by said valve-operating means providing for opening of the first-mentioned valve and opening of said mixing and discharge valve by one and the same operation of said valve-operating means, said discharge and mixing valve having a frusto-conical body in said mixing and discharge passage with its smaller end facing toward said valve seat, there being a tubular extension carrying said gasket at the opposite side of said valve seat from said body and having lateral ports adjacent said gasket and adjacent said frusto-conical body, respectively, connecting the interior of said extension to its exterior to cause mixing liquid when the gasket is spaced from said valve seat to pass from said supply inlet over said frusto-conical body and become diffused into the first mentioned liquid.

References Cited

UNITED STATES PATENTS

| | | | |
|---|---|---|---|
| 1,603,082 | 10/1926 | Jacobs | 137—607 |
| 2,202,971 | 6/1940 | Vedoe | 137—636.4 X |
| 2,568,444 | 9/1951 | Giuliano | 137—635 |
| 2,615,668 | 10/1952 | Ernest | 251—7 |
| 2,652,222 | 9/1953 | McCowan | 251—7 |
| 2,888,040 | 5/1959 | Terwilliger | 137—635 |

FOREIGN PATENTS 686,011  12/1939  Germany.

CLARENCE R. GORDON, *Primary Examiner.*